(12) United States Patent
Thomas et al.

(10) Patent No.: US 8,266,124 B2
(45) Date of Patent: Sep. 11, 2012

(54) INTEGRATED ASSET MANAGEMENT

(75) Inventors: Shawn Thomas, Austin, TX (US);
Gregory Gray, Austin, TX (US);
Michael Woodfin, Austin, TX (US);
Warner Mizell, Austin, TX (US); Brian Thomas, Austin, TX (US)

(73) Assignee: Caldvor Acquisitions Ltd., LLC, Dover, DE (US)

( * ) Notice: Subject to any disclaimer, the term of this patent is extended or adjusted under 35 U.S.C. 154(b) by 2473 days.

(21) Appl. No.: 10/321,107

(22) Filed: Dec. 17, 2002

(65) Prior Publication Data
US 2003/0154199 A1    Aug. 14, 2003

Related U.S. Application Data

(60) Provisional application No. 60/342,031, filed on Dec. 18, 2001.

(51) Int. Cl.
*G06F 17/00* (2006.01)
(52) U.S. Cl. ........ 707/703; 707/791; 707/793; 707/796; 707/811; 707/802
(58) Field of Classification Search .................. 707/200, 707/201, 104.1, 703, 791, 793, 796, 802, 707/811, 822; 705/8, 39; 703/22; 709/217
See application file for complete search history.

(56) References Cited

U.S. PATENT DOCUMENTS

| | | | |
|---|---|---|---|
| 4,558,413 A | 12/1985 | Schmidt et al. | |
| 4,643,112 A | 2/1987 | Sidler et al. | |
| 4,653,112 A | 3/1987 | Ouimette | |
| 4,695,946 A | 9/1987 | Andreasen et al. | |
| 4,714,995 A | 12/1987 | Materna et al. | |
| 5,005,122 A | 4/1991 | Griffin et al. | |
| 5,019,963 A | 5/1991 | Alderson et al. | |
| 5,133,075 A | 7/1992 | Risch | |
| 5,155,847 A | 10/1992 | Kirouac et al. | |
| 5,249,290 A | 9/1993 | Heizer | |
| 5,278,982 A | 1/1994 | Daniels | |
| 5,339,176 A | 8/1994 | Smilansky et al. | |
| 5,355,498 A | 10/1994 | Provino | |
| 5,414,843 A * | 5/1995 | Nakamura et al. | ......... 707/104.1 |

(Continued)

FOREIGN PATENT DOCUMENTS

CN    1204410    1/1999

(Continued)

OTHER PUBLICATIONS

"PCT International Preliminary Examination Report", Application No. PCT/US02/40820, 1 pages.

(Continued)

*Primary Examiner* — Sana Al Hashemi
(74) *Attorney, Agent, or Firm* — Perkins Coie LLP

(57) ABSTRACT

The method and system of the present invention provides an improved technique for integrated asset management. Information is aggregated from a variety of sources into a centralized computerized database. Thereafter, asset transition events are scheduled. Information from the centralized computerized database is used in the performance of the asset transition events and information relating to the asset transition events is added to the centralized computerized database. Subsequent changes to the asset are also recorded into the centralized computerized database. As a result, a plethora of information is available within said database for the purpose of managing future asset transition events.

37 Claims, 11 Drawing Sheets

U.S. PATENT DOCUMENTS

| | | | |
|---|---|---|---|
| 5,586,322 A | 12/1996 | Beck et al. | |
| 5,673,382 A | 9/1997 | Cannon | |
| 5,678,002 A | 10/1997 | Fawcett et al. | |
| 5,752,244 A | 5/1998 | Rose | |
| 5,778,395 A | 7/1998 | Whiting et al. | |
| 5,783,951 A | 7/1998 | Stein et al. | |
| 5,784,578 A | 7/1998 | Galloway | |
| 5,787,234 A | 7/1998 | Molloy | |
| 5,787,491 A | 7/1998 | Merkin et al. | |
| 5,793,951 A | 8/1998 | Stein et al. | |
| 5,799,147 A | 8/1998 | Shannon | |
| 5,819,020 A | 10/1998 | Beeler | |
| 5,852,811 A | 12/1998 | Atkins | |
| 5,864,828 A | 1/1999 | Atkins | |
| 5,881,285 A | 3/1999 | DeLeeuw | |
| 5,884,285 A | 3/1999 | Atkins | |
| 5,893,904 A | 4/1999 | Harris | |
| 5,893,906 A | 4/1999 | Daffin | |
| 5,909,669 A | 6/1999 | Havens | |
| 5,911,135 A | 6/1999 | Atkins | |
| 5,911,136 A | 6/1999 | Atkins | |
| 5,920,700 A | 7/1999 | Gordon et al. | |
| 5,923,850 A | 7/1999 | Barroux | |
| 5,930,342 A | 7/1999 | Mazzapica | |
| 5,959,275 A | 9/1999 | Hughes | |
| 5,974,536 A | 10/1999 | Richardson | |
| 5,974,563 A | 10/1999 | Beeler, Jr. | |
| 6,016,500 A | 1/2000 | Waldo | |
| 6,026,500 A | 2/2000 | Topff | |
| 6,038,551 A | 3/2000 | Barlow | |
| 6,038,665 A | 3/2000 | Bolt et al. | |
| 6,049,784 A | 4/2000 | Weatherly et al. | |
| 6,052,694 A | 4/2000 | Bromberg | |
| 6,108,641 A | 8/2000 | Kenna | |
| 6,110,229 A | 8/2000 | Yamaguchi | |
| 6,118,447 A | 9/2000 | Harel | |
| 6,127,661 A | 10/2000 | Fry | |
| 6,128,661 A | 10/2000 | Flanagin et al. | |
| 6,145,126 A | 11/2000 | Matsukura et al. | |
| 6,161,176 A | 12/2000 | Hunter et al. | |
| 6,181,336 B1 | 1/2001 | Chiu | |
| 6,182,212 B1 | 1/2001 | Atkins | |
| 6,182,226 B1 | 1/2001 | Reid et al. | |
| 6,185,576 B1 | 2/2001 | McIntosh | |
| 6,189,008 B1 | 2/2001 | Easty et al. | |
| 6,212,280 B1 | 4/2001 | Howard | |
| 6,220,768 B1 | 4/2001 | Barroux | |
| 6,230,287 B1 | 5/2001 | Pinard et al. | |
| 6,237,009 B1 | 5/2001 | Waldo et al. | |
| 6,237,617 B1 | 5/2001 | Sturman et al. | |
| 6,252,694 B1 | 6/2001 | Shinada | |
| 6,256,773 B1 | 7/2001 | Bowman-Amuah | |
| 6,266,774 B1 | 7/2001 | Sampath | |
| 6,281,894 B1 | 8/2001 | Rive | |
| 6,289,378 B1 | 9/2001 | Meyer et al. | |
| 6,327,579 B1 | 12/2001 | Crawford | |
| 6,327,617 B1 | 12/2001 | Fawcett | |
| 6,330,566 B1 | 12/2001 | Durham | |
| 6,351,776 B1 | 2/2002 | O'Brien et al. | |
| 6,363,498 B1 | 3/2002 | Howell | |
| 6,363,499 B1 | 3/2002 | Delo | |
| 6,366,916 B1 | 4/2002 | Baer | |
| 6,370,646 B1 | 4/2002 | Goodman | |
| 6,373,416 B1 | 4/2002 | McGrath et al. | |
| 6,373,434 B1 | 4/2002 | Hayakawa | |
| 6,374,263 B1 * | 4/2002 | Bunger et al. | 707/201 |
| 6,381,644 B2 | 4/2002 | Munguia | |
| 6,385,621 B1 | 5/2002 | Frisina | |
| 6,385,707 B1 | 5/2002 | Maffezzoni | |
| 6,411,936 B1 | 6/2002 | Sanders | |
| 6,438,749 B1 | 8/2002 | Chamberlain | |
| 6,473,794 B1 | 10/2002 | Guheen et al. | |
| 6,490,587 B2 | 12/2002 | Easty | |
| 6,499,049 B2 | 12/2002 | Waldo | |
| 6,502,096 B1 | 12/2002 | Siefert | |
| 6,519,600 B1 | 2/2003 | Siefert | |
| 6,532,543 B1 | 3/2003 | Smith | |
| 6,557,008 B1 | 4/2003 | Temple | |
| 6,571,276 B1 | 5/2003 | Burns | |
| 6,574,522 B1 | 6/2003 | Douglas et al. | |
| 6,574,617 B1 | 6/2003 | Immerman et al. | |
| 6,609,090 B1 | 8/2003 | Hickman et al. | |
| 6,625,622 B1 | 9/2003 | Henrickson | |
| 6,633,977 B1 | 10/2003 | Hamilton, II et al. | |
| 6,636,857 B2 | 10/2003 | Thomas | |
| 6,650,622 B1 | 11/2003 | Austerman | |
| 6,651,050 B2 | 11/2003 | Shafrir et al. | |
| 6,654,802 B1 | 11/2003 | Oliva | |
| 6,662,357 B1 | 12/2003 | Bowman-Amuah | |
| 6,691,064 B2 | 2/2004 | Vroman | |
| 6,732,278 B2 | 5/2004 | Baird, III et al. | |
| 6,782,394 B1 * | 8/2004 | Landeck et al. | 707/104.1 |
| 6,829,734 B1 | 12/2004 | Kreulen et al. | |
| 6,871,322 B2 | 3/2005 | Gusler et al. | |
| 6,873,988 B2 | 3/2005 | Herrmann et al. | |
| 6,882,961 B2 | 4/2005 | Cobble et al. | |
| 7,080,372 B1 | 7/2006 | Cole | |
| 7,110,353 B1 | 9/2006 | Deschaine et al. | |
| 7,467,198 B2 * | 12/2008 | Goodman et al. | 709/223 |
| 2001/0007128 A1 | 7/2001 | Lambert et al. | |
| 2001/0012337 A1 | 8/2001 | Horie | |
| 2001/0026619 A1 | 10/2001 | Howard | |
| 2001/0029474 A1 | 10/2001 | Yada | |
| 2001/0037333 A1 | 11/2001 | Nishimura | |
| 2001/0052013 A1 | 12/2001 | Munguia | |
| 2002/0010808 A1 | 1/2002 | Wiggins et al. | |
| 2002/0010863 A1 | 1/2002 | Mankefors | |
| 2002/0038267 A1 | 3/2002 | Can et al. | |
| 2002/0065736 A1 | 5/2002 | Willner et al. | |
| 2002/0065825 A1 | 5/2002 | Kassan | |
| 2002/0073114 A1 | 6/2002 | Nicastro et al. | |
| 2002/0082966 A1 | 6/2002 | O'Brien | |
| 2002/0082997 A1 | 6/2002 | Kobata | |
| 2002/0083102 A1 | 6/2002 | Vetter | |
| 2002/0091699 A1 | 7/2002 | Norton | |
| 2002/0091975 A1 | 7/2002 | Redlich et al. | |
| 2002/0099934 A1 | 7/2002 | Cromer | |
| 2002/0103806 A1 | 8/2002 | Yamanoue | |
| 2002/0104080 A1 | 8/2002 | Woodard | |
| 2002/0123983 A1 | 9/2002 | Riley | |
| 2002/0143421 A1 | 10/2002 | Wetzer | |
| 2002/0143598 A1 | 10/2002 | Scheer | |
| 2002/0143775 A1 | 10/2002 | Wilkinson | |
| 2002/0143782 A1 | 10/2002 | Headings | |
| 2002/0147601 A1 | 10/2002 | Fagan | |
| 2002/0152151 A1 | 10/2002 | Baughman | |
| 2002/0152229 A1 | 10/2002 | Peng | |
| 2002/0161600 A1 | 10/2002 | Stubiger | |
| 2002/0169714 A1 * | 11/2002 | Ike et al. | 705/39 |
| 2002/0184619 A1 | 12/2002 | Meyerson | |
| 2002/0184652 A1 | 12/2002 | Cezeaux | |
| 2002/0194194 A1 | 12/2002 | Fenton | |
| 2002/0198997 A1 | 12/2002 | Linthicum | |
| 2003/0004925 A1 | 1/2003 | Knoblock et al. | |
| 2003/0009455 A1 | 1/2003 | Carlson | |
| 2003/0009540 A1 | 1/2003 | Benfield et al. | |
| 2003/0014508 A1 | 1/2003 | Cheston | |
| 2003/0018746 A1 | 1/2003 | Boesch | |
| 2003/0046371 A1 | 3/2003 | Falkner | |
| 2003/0055749 A1 | 3/2003 | Carmody | |
| 2003/0056140 A1 | 3/2003 | Taylor | |
| 2003/0061159 A1 | 3/2003 | Adams | |
| 2003/0079132 A1 | 4/2003 | Bryant | |
| 2003/0084067 A1 | 5/2003 | Obiaya | |
| 2003/0084460 A1 | 5/2003 | Chung | |
| 2003/0093521 A1 | 5/2003 | Schlonski | |
| 2003/0093688 A1 | 5/2003 | Helgesen et al. | 713/200 |
| 2003/0110169 A1 | 6/2003 | Zuili | |
| 2003/0120677 A1 | 6/2003 | Vernon | |
| 2003/0120684 A1 | 6/2003 | Zuili | |
| 2003/0126047 A1 | 7/2003 | Hollar | |
| 2003/0126048 A1 | 7/2003 | Hollar | |
| 2003/0130820 A1 | 7/2003 | Lane | |
| 2003/0139985 A1 | 7/2003 | Hollar | |
| 2003/0140031 A1 | 7/2003 | Thomas | |
| 2003/0140046 A1 | 7/2003 | Thomas | |
| 2003/0140052 A1 | 7/2003 | Thomas | |

| | | | |
|---|---|---|---|
| 2003/0140057 | A1 | 7/2003 | Thomas |
| 2003/0140150 | A1 | 7/2003 | Kemp |
| 2003/0154199 | A1 | 8/2003 | Thomas |
| 2003/0167323 | A1 | 9/2003 | Motoyama |
| 2003/0172020 | A1 | 9/2003 | Davies |
| 2003/0182211 | A1 | 9/2003 | Sakurazawa |
| 2003/0187758 | A1 | 10/2003 | McKalko |
| 2003/0195764 | A1 | 10/2003 | Baker |
| 2003/0200274 | A1 | 10/2003 | Henrickson |
| 2003/0200299 | A1 | 10/2003 | Jamison |
| 2003/0200304 | A1 | 10/2003 | Thorpe |
| 2003/0216976 | A1 | 11/2003 | Ehrman |
| 2003/0217042 | A1 | 11/2003 | Thomas |
| 2003/0217062 | A1 | 11/2003 | Thomas |
| 2003/0225707 | A1 | 12/2003 | Ehrman |
| 2003/0225927 | A1 | 12/2003 | Goodman |
| 2003/0233287 | A1 | 12/2003 | Sadler |
| 2003/0237022 | A1 | 12/2003 | Thayer |
| 2004/0001088 | A1 | 1/2004 | Stancil |
| 2004/0012808 | A1 | 1/2004 | Payne |
| 2004/0024657 | A1 | 2/2004 | Wright |
| 2004/0044688 | A1 | 3/2004 | Brudz |
| 2004/0049578 | A1 | 3/2004 | Ohara |
| 2004/0143428 | A1* | 7/2004 | Rappaport et al. ............... 703/22 |
| 2005/0114468 | A1* | 5/2005 | Philyaw ........................ 709/217 |

FOREIGN PATENT DOCUMENTS

| | | |
|---|---|---|
| EP | 0 836 140 | 4/1998 |
| EP | 0836140 | 4/1998 |
| EP | 0881567 | 12/1998 |
| EP | 1197886 | 4/2002 |
| EP | 1 251 656 | 10/2002 |
| EP | 1251656 | 10/2002 |
| EP | 1 255 196 | 11/2002 |
| EP | 1255196 | 11/2002 |
| GB | 2340273 | 2/2000 |
| GB | 2340273 A | 2/2000 |
| JP | 03173273 | 6/2003 |
| WO | PCT/AU97/00594 | 1/1997 |
| WO | WO-9812656 | 3/1998 |
| WO | PCT/US98/09517 | 11/1998 |
| WO | WO-9853396 | 11/1998 |
| WO | PCT/US00/07471 | 2/2000 |
| WO | PCT/US00/29146 | 5/2000 |
| WO | PCT/US00/11140 | 11/2000 |
| WO | PCT/US00/12806 | 11/2000 |
| WO | WO-0065438 | 11/2000 |
| WO | WO-0068816 | 11/2000 |
| WO | PCT/US00/32324 | 5/2001 |
| WO | WO-0131482 | 5/2001 |
| WO | WO-0131494 | 5/2001 |
| WO | PCT/US01/13809 | 11/2001 |
| WO | PCT/US01/14171 | 11/2001 |
| WO | WO-0184274 | 11/2001 |
| WO | PCT/US01/16629 | 3/2002 |
| WO | PCT/US02/20487 | 3/2002 |
| WO | WO-0221274 | 3/2002 |
| WO | PCT/US01/32576 | 4/2002 |
| WO | PCT/US02/08663 | 10/2002 |
| WO | PCT/US02/15822 | 12/2002 |
| WO | PCT/US02/40817 | 1/2003 |
| WO | PCT/US02/40820 | 2/2003 |
| WO | PCT/US02/30857 | 4/2003 |
| WO | PCT/US02/37197 | 5/2003 |
| WO | PCT/SG02/00278 | 6/2003 |
| WO | PCT/US02/40617 | 6/2003 |
| WO | WO-03052559 | 6/2003 |
| WO | WO-03052601 | 6/2003 |
| WO | WO 03/096179 | 11/2003 |
| WO | PCT/IB03/002555 | 12/2003 |
| WO | WO-03002555 | 12/2003 |
| WO | WO-04001589 | 12/2003 |

OTHER PUBLICATIONS

"International Search Report", PCT/US02/40601, (Nov. 24, 2003).
"PCT International Preliminary Examination Report", PCT/US02/40601, (Apr. 26, 2004).
"Final Office Action", U.S. Appl. No. 10/321,037, (Dec. 27, 2007),8 pages.
"Non-Final Office Action", U.S. Appl. No. 10/321,037, (Sep. 19, 2007),5 pages.
"Non-Final Office Action", U.S. Appl. No. 10/321,037, (Jan. 5, 2007),7 pages.
"Advisory Action", U.S. Appl. No. 10/321,037, (Sep. 8, 2006),3 pages.
"Final Office Action", U.S. Appl. No. 10/321,037, (May 10, 2006),7 pages.
"Non-Final Office Action", U.S. Appl. No. 10/321,037, (May 18, 2005),6 pages.
"Advisory Action", U.S. Appl. No. 10/321,036, (Oct. 17, 2006),3 pages.
"Final Office Action", U.S. Appl. No. 10/321,036, (Jul. 28, 2006),12 pages.
"Non Final Office Action", U.S. Appl. No. 10/321,036, (Feb. 10, 2006),11 pages.
"Non-Final Office Action", U.S. Appl. No. 10/321,036, (Sep. 15, 2005),10 pages.
"Final Office Action", U.S. Appl. No. 10/321,117, (Mar. 23, 2007).
"Non-Final Office Action", U.S. Appl. No. 10/321,117, (Oct. 2, 2006),9 pages.
"Final Office Action", U.S. Appl. No. 10/321,117, (Jan. 9, 2006),8 pages.
"Non-Final Office Action", U.S. Appl. No. 10/321,117, (Aug. 2, 2005),7 pages.
"Non-Final Office Action", U.S. Appl. No. 10/321,118, (Jul. 26, 2006),8 pages.
"Non-Final Office Action", U.S. Appl. No. 10/464,176, (Jan. 22, 2009),6 pages.
"Restriction Requirement", U.S. Appl. No. 10/464,176, (Jul. 15, 2008),7 pages.
"Final Office Action", U.S. Appl. No. 10/464,176, (Nov. 16, 2006),26 pages.
"Non-Final Office Action", U.S. Appl. No. 10/464,176, (Mar. 26, 2006),25.
"Non-Final Office Action", U.S. Appl. No. 10/464,176, (Jan. 21, 2004),28.
Stephen Blott Lukas Relly Hans-Jorg Schek, Institute for Information Systems, "An Open Abstract-Object Storage System" SIGMOD, Montreal, Canada, 1996.
John Gaffney, Illustra Information Technologies, Inc., "An Illustra Technical White Paper", Oakland, CA, Mar. 1996.
Emma Stroud, Internet World, "Managing Your Assets", May 1, 2001.
digital-assets.net, "TransLink", Fall of 1995.
OPTO 22, Snap-It "Effectively Managing Real-World Assets From IT", Temecula, CA, 2000.
Unicenter IT Resource Management-CA Solutions, "Your Complete Life Cycle Management Solution for Managing On-Demand Computing", May 2002.
"Foreign Notice of Rejection", Application Serial. No. 02825256.X, (Feb. 13, 2009),10 pages.
"Foreign Office Action", Application Serial No. 02827159.9, (Apr. 24, 2009),10 pages.
PCT International Search Report, PCT/US02/40617, dated Apr. 28, 2004.
PCT Written Opinion, PCT/US02/40617, dated Sep. 22, 2006.
Oppliger, R. "Security at the Internet Layer," Federal Office of Information Technology and Systems; Computer, vol. 31, Issue: 9, pp. 43-47, Sep. 1998; ISSN: 0018-9162; http://ieexplore.ieee.org.
Aguilar, Rautert, and Pater, "Business Process Simulation: A Fundamental Step Supporting Process Centered Management," Proceedings of the 1999 Winter Simulation Conference; pp. 1383-1392; Business Process Architecture project, winter 1999.
Microsoft Corporation, "The Windows Interface, An Application Design Guide," 1991, Microsoft Press, p. 4.
Lubanski, Mike and Doshi, Darshan, "SMS 2 Administration," 2000, New Riders Publishing, Chapter 1.
Codd, E.F., "A relational Model of Data for Large Shared Data Banks," originally published in CACM, Jun. 1970,republished in "Readings in Database Systems," 3rd Edition edited by Michael Stonebraker and Joseph M. Hellerstein, 1998, pp. 5-15.

PowerQuest Corporation, "PowerQuest Drive Image Professional v.2 User Guide," 1998, PowerQuest Corporation, Guide p. xvii, pp. 15-44, Supplement p. 1. (Office Action dated Jan. 21, 2004).

Patent Abstracts of Japan, 03173273 A, Jul. 26, 1991.

"Foreign Office Action", Chinese Application No. 02825544.5, (Oct. 9, 2009), 10 Pages.

"Notice of Allowance", U.S. Appl. No. 10/464,176, (Nov. 30, 2009), 10 pages.

"Final Office Action", U.S. Appl. No. 10/464,176, (Aug. 4, 2009), 9 pages.

"Intelligent Asset Management", ASAP Software,(2003), 5 pages.

"Non Final Office Action", U.S. Appl. No. 12/056,969, (Aug. 25, 2009), 16 pages.

"PCT International Preliminary Examination Report", Application No. PCT/US02/40820, (Oct. 21, 2004), 3 pages.

"Foreign Office Action", Chinese Application No. 02825544.5, (Jan. 22, 2010), 11 pages.

"Foreign Office Action", Chinese Application No. 02827159.9, (Jan. 29, 2010), 14 pages.

"Non-Final Office Action", U.S. Appl. No. 12/056,969, (Feb. 22, 2010), 13 pages.

* cited by examiner

User Information

FIG. 3

Legacy Asset Information

FIG. 4

New Asset Information

FIG. 5

Software Application Information

Application Management Process

System Inventory Information

FIG. 8

Data Dictionary

FIG. 9

User Software Information

FIG. 10

INTEGRATED ASSET MANAGEMENT

This non-provisional application claims priority based upon prior U.S. Provisional Patent Application Ser. No. 60/342,031 filed Dec. 18, 2001 in the names of Shawn Thomas, Gregory Gray, Michael Woodfin, Warner Mizell and Brian Thomas, entitled "Method and System for Deploying, Tracking and Managing Technology-Related Resources."

BACKGROUND

Technical Field of the Invention

In most cases, a physical inventory is taken to determine what assets the company has in inventory and the current status of those assets. Typically, a computer technician would access the existing asset and make either handwritten notes of the user's setting and preferences or input the information into a computer and save it to a diskette. This process is expensive and time consuming and yields a static result in which the data becomes stale as soon as the asset returns to service.

Effective asset management using existing methods is further limited because the information that is collected is not collected in such a manner that it is can be compiled, managed and updated in the future. Under existing methods, once the computer technician re-installs the information on a new machine, he destroys any records that he may have kept relating, for example, to the specific versions of software installed, the serial number of the computer on which it was installed or the date of installation and, if the information is saved, it is usually not accessible in an organized, easily-accessible manner. Consequently, when the new machine is ready to be upgraded, relocated or decommissioned, the computer technician must start anew to gather information about it and the user's settings and preferences.

There is a need, therefore, for an improved method and system for integrated asset management.

SUMMARY

Various embodiments provide a method for asset management in which information concerning the asset and the user are aggregated from a variety of sources into a computerized centralized database. Thereafter, asset transition events are scheduled. Information from the centralized computerized database is used in the performance of the asset transition events and information relating to the asset transition events is added to the centralized computerized database. Subsequent changes to the asset are also recorded into the centralized computerized database. As a result, a plethora of information is available within said database for the purpose of managing future asset transition events.

BRIEF DESCRIPTION OF THE DRAWINGS

The disclosed invention will be described with reference to the accompanying drawings, which show important sample embodiments of the invention and which are incorporated in the specification hereof by reference, wherein:

FIG. 3 is a screen display showing user information aggregated during the method for integrated asset management;

FIG. 4 is a screen display showing current asset information aggregated during the method for integrated asset management;

FIG. 5 is a screen display showing new asset information aggregated during the method for integrated asset management;

FIG. 8 is a screen display showing system inventory information collected during the application management process;

FIG. 9 is a screen display showing the application dictionary; and

FIG. 10 is a screen display showing user software information collected during the application management process.

DETAILED DESCRIPTION

The numerous innovative teachings of the present application will be described with particular reference to the present embodiments. However, it should be understood that these embodiments provide only a few examples of the many advantageous uses of the innovative teachings herein. In general, statements made in the specification of the present application do not necessarily delimit any of the various claimed inventions. Moreover, some statements may apply to some inventive features, but not to others.

Figure 1:
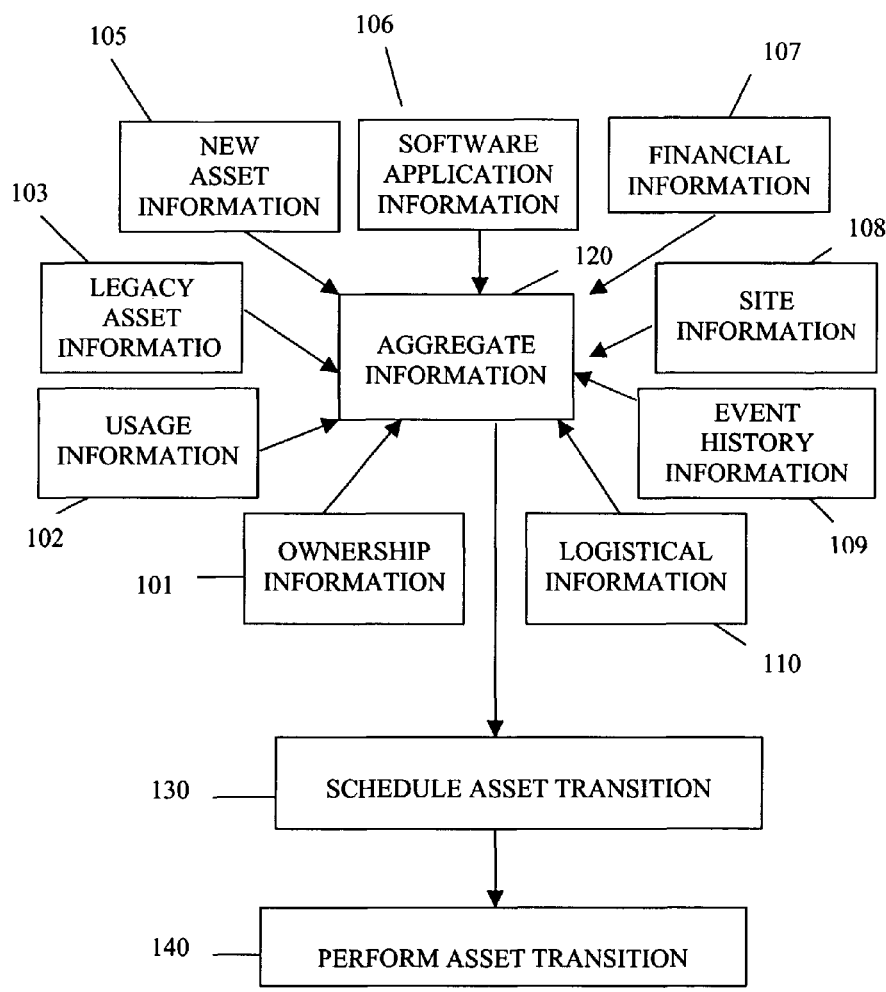
FIG. 1 is a flow diagram of a typical asset management workflow process.

FIG. 1 illustrates a typical asset management workflow. The initial step is to aggregate information 120. Information can be derived from a number of different sources. For example, information necessary in the asset transition may include ownership information 101, usage information 102, user information 103, legacy asset information 104, new asset information 105, software application information 106, financial information 107, site information 108, event history information 109, and logistical information 110. The initial assessment of available data sources dictates the process that will be used to acquire this information. In general, it may be desirable to utilize existing data sources provided by the user. Because of the volume of information required, it is often difficult to obtain thorough information regarding the assets in question. In such cases, it may be necessary to proceed with an asset transition without all available information or to delay the asset transition until such time as the information is available.

Once information regarding the assets in question has been aggregated, a company will typically schedule an asset transition 130, such as an asset installation, asset relocation, asset disposition or asset maintenance activity. The scheduling activity is typically conducted on an ad hoc user by user basis, with little thought given to sequencing the asset transition services occurring between individual users and between individual assets. This results in a costly and inefficient asset transition.

The next step is to perform the asset transition 140. Even though great effort may have been expended in order to aggregate the information, little effort is typically made to retain, manage, or update that information for future use. Generally, records may be kept of the asset transition activities, but no effort is made to keep the information current on an ongoing basis.

Figure 2:
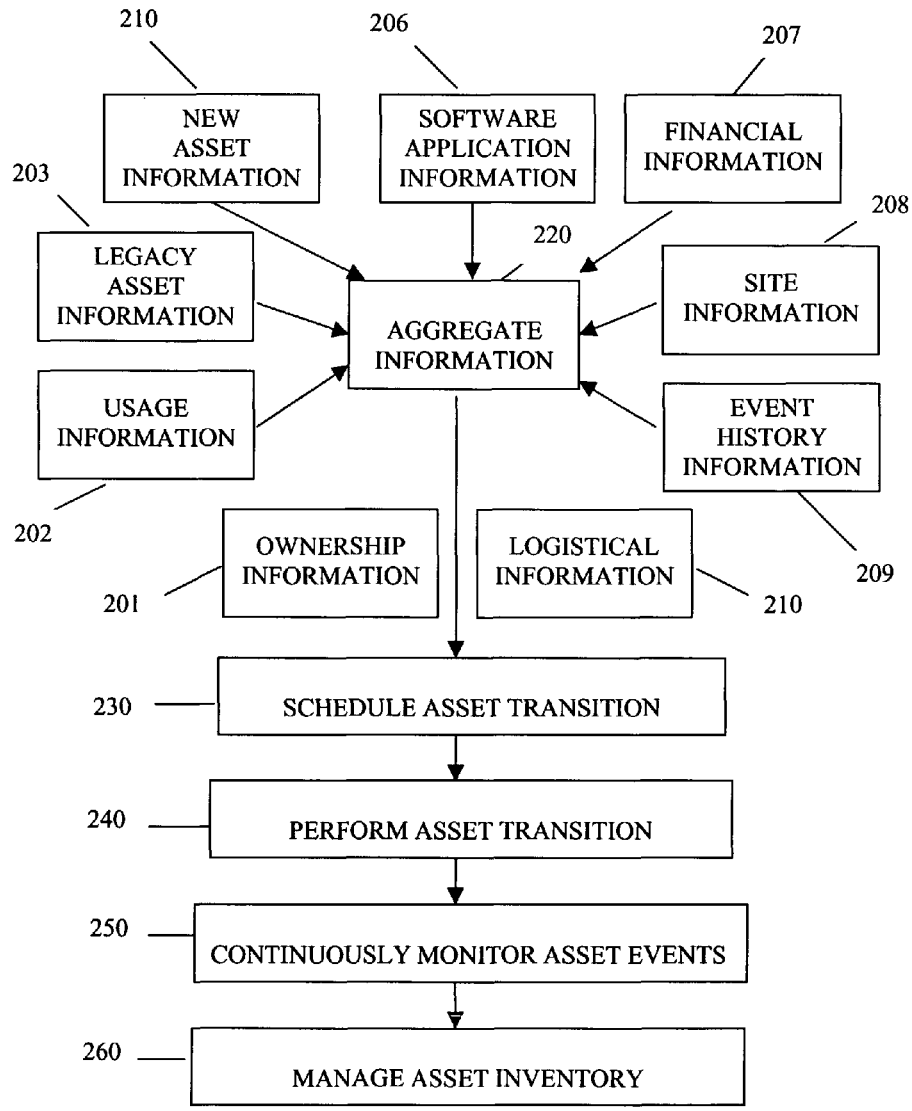
FIG. 2 is a workflow diagram showing the preferred method for asset management according to the present invention.

A method for integrated asset management according to one embodiment is shown in FIG. 2. The first step is to aggregate information 220. Once again, the type of information aggregated includes ownership information 201, usage information 202, user information 203, legacy asset information 204, new asset information 205, software application information 206, financial information 207, site information 208, event history information 209, and logistical information 210. Once aggregated, the information is stored, for example, in a relational database.

Under this embodiment, it may be desirable to obtain accurate information in each of the foregoing instances. When accurate, up-to-date information is available, that information may be included within the information that is aggregated. If accurate and up-to-date information is not available, it may be necessary to match multiple data sources and utilize discovery technology to build an accurate information repository. Although additional time is required to gather information anew, it may be desirable to have accurate and complete information in the repository. This information can be acquired in a number of ways. For example, the typical sources for user information are either the human resource system or e-mail. Typical sources for legacy asset information include fixed asset schedules and legacy asset management systems. Software application information may be found through an electronic discovery process and site information can be derived from the human resource system, fixed asset system, facilities information, IP address schemes, or internal address books.

It is instructive to examine the type of information aggregated as part of this embodiment. For example, user information 203 provides details about each end user who will be involved from a service delivery standpoint. Such information includes the user's name, contact phone numbers, mail addresses, e-mail addresses and organizational information, such as manager, department and cost center. User information 203 may also include information regarding the user's role in the organization, if they have the IP status and if they are a remote user.

Legacy asset information 204 includes such information as configuration, serial numbers, manufacturer, make, model, internal components, and attached devices. This information is typically gathered through use of an electronic discovery technology. Other legacy asset information 204 includes details about the physical location of an asset within a building, cube number, office number, jack number and IP address.

New asset information 205 is the information used for procurement or order placement. The details for each new asset are derived from an integrated configuration catalogue. The catalogue contains the basic system information as well as details about specific configuration options for each new asset. This information is then sent to the manufacturers to acquire the appropriate new assets for the technology implementation. New asset information may include such information as scheduled install date, new workstation type, workstation description, workstation costs, and attached devices. For application information 206 identifies which software applications are being used by, or are resident on, a given asset. For application information 206 can be obtained by scanning the shortcuts or an in-depth scan of all executable files on the computer. The results of the scan are then filtered against an application dictionary. The application dictionary contains a profile of each application in it, its current status, ownership and readiness for deployment. The application filtering process yields a definitive list of the applications that need to be installed on the new device. A detailed description of the preferred embodiment for collection of software application information is described later.

Site information 208 includes information about each individual site where a service will be performed. Site information 208 includes basic information, such as address and type of site, as well as detailed information about the logistics of the site, such as network infrastructure, special considerations regarding accessing the site, and contact resources.

The foregoing examples are intended to illustrate the types of information to be collected as part of the initial step of aggregating information 220. The information is stored on a storage medium distinct from the asset in question. Information may be stored on the remote storage medium in a centralized computerized database. Information may be transmitted to this centralized computerized database, for example, through the Internet or through a local area network. Also, it may be desirable to transmit such information by means of a secure, encrypted transmission. Alternatively, it may be desirable to change the file into formatted data files prior to transmission or to incorporate a means for removing unwanted or redundant information prior to transmission.

After all information has been aggregated, the next step is to schedule the asset transition 230. Assets involved in the asset transition may be, for example, desktop computers, laptop computers, handheld computers, printers, scanners, networking devices and storage devices. In the preferred embodiment, users are grouped together by site and proximity that will be the makeup of a scheduled implementation. Scheduling is facilitated through a series of automated processes that reconcile the activities of software, labor and equipment components necessary for the asset transition. As the transition activities are scheduled, a series of readiness checks are performed to ensure that the new assets and applications are ready for deployment. If certain assets or applications are not ready, the schedule is instantaneously modified in order to minimize activity disruptions during the asset transition process.

The next step is to perform the asset transition 240. Depending upon the specific transition to be performed, a tailored web page or series of web pages to guide the technician through the process. The use of automated functions simplifies and streamlines the transition process. Examples of the types of automated processes used to perform asset transition 240 include a central repository of the aggregated information, an auto discovery agent that detects all relevant aspects of a networked device and its resident applications, an automated application to backup and restore user data from an old device to a new device, an automated application to backup and restore personality settings from an old device to a new device, an automated application to detect an asset's serial number, an application dictionary as previously described, and an automated application that invokes the downloading of a user's application from a remote database. These integrated technologies are inherent in the preferred embodiment and are critical to support an efficient workflow process, maintain an up-to-date central repository, reduce technician time, reduce technician error, capture and track the results of a technician's work as he performs tasks and make accurate information available to interested parties.

The specific process performed by the technician as he performs asset transition 240 may have multiple steps. Use of the web page system allows the ability to capture information about each step such as time, number of units installed and increments. This information is used for ongoing asset management. For example, the information captured during the process notify the actual minutes required to perform a task, the actual number of data files and sizes backed up and restored, and the duration of time involved.

The next step is to engage in continuously monitoring asset events 250. This step is critical to maintain a vibrant and robust repository of information. As new asset transition events occur, information from those events must be added to the information repository in order to keep the most current information available to interested parties.

The final step in the process is the management of asset inventory 260. As the information repository contains accurate, up-to-date information regarding the assets, those assets can be managed in on a real-time basis. Assets may be managed at a very high level, for example, in an executive summary, down to a detailed task level. Information available to assist in asset management may include, for example, status by location, status by group, hardware mix by site, user detailed software reports, warehouse status by group, technical status, asset reconciliation, asset disposition and user survey satisfaction. Management may include project management, installation management, relocation management, lease management, exception management, scheduling management, workflow management and resource management. In addition reports may be generated based on the aforementioned management activities, including such reports as project reports, asset reports, lease reports, activity reports, exception reports and consumer satisfaction reports. As part of the overall management function, a means may also be provided for monitoring, updating and controlling versions of the software installed on different devices or a means for translating information in the centralized computerized database into a common language.

Figure 3:
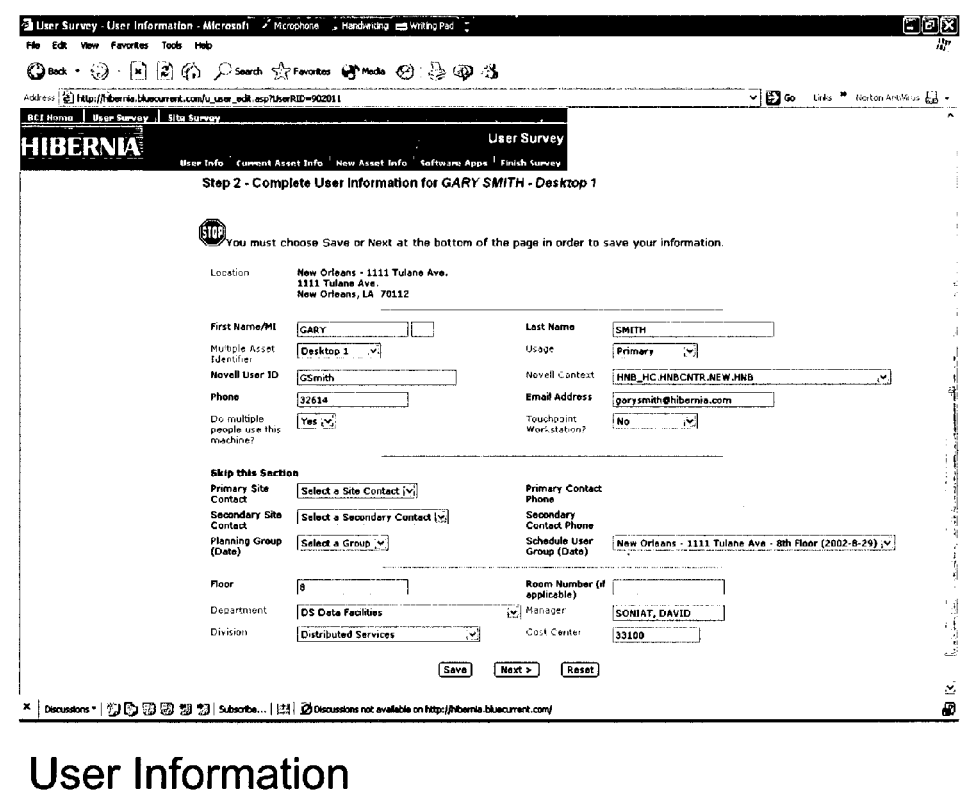

FIG. 3 illustrates a screen display in which the technician is prompted to impute user information. User information will provide detail about each end user who will be involved in the process. User information includes new names, contact phone numbers, e-mail addresses and organizational information, such as the manager's name, user's department and cost center. Other user information may include the user's role in the organization, whether or not the user has VIP status and whether or not they use the system remotely.

Figure 4:
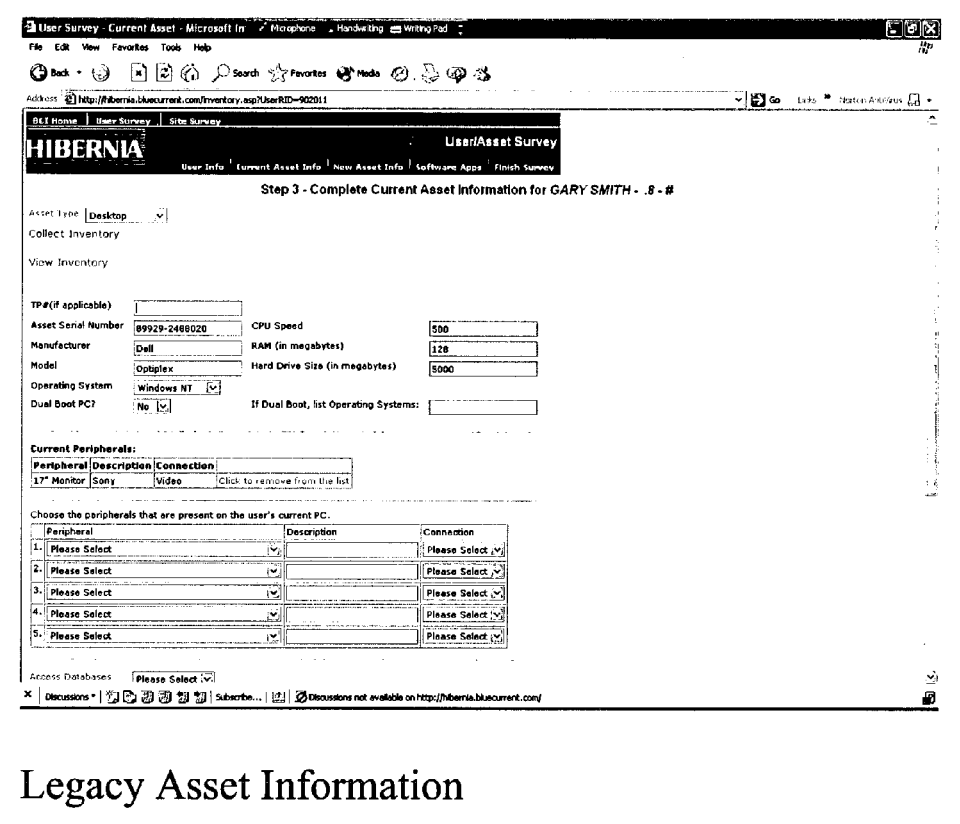

FIG. 4 illustrates a screen display which the technician may use to impute Legacy Asset information. This may include such information as the configuration, serial numbers, manufacturer, make, model, internal components and attached devices. Other Legacy Asset information may include details regarding the physical location of the asset within a building, office number, cube number, jack number and IP address.

Figure 5:
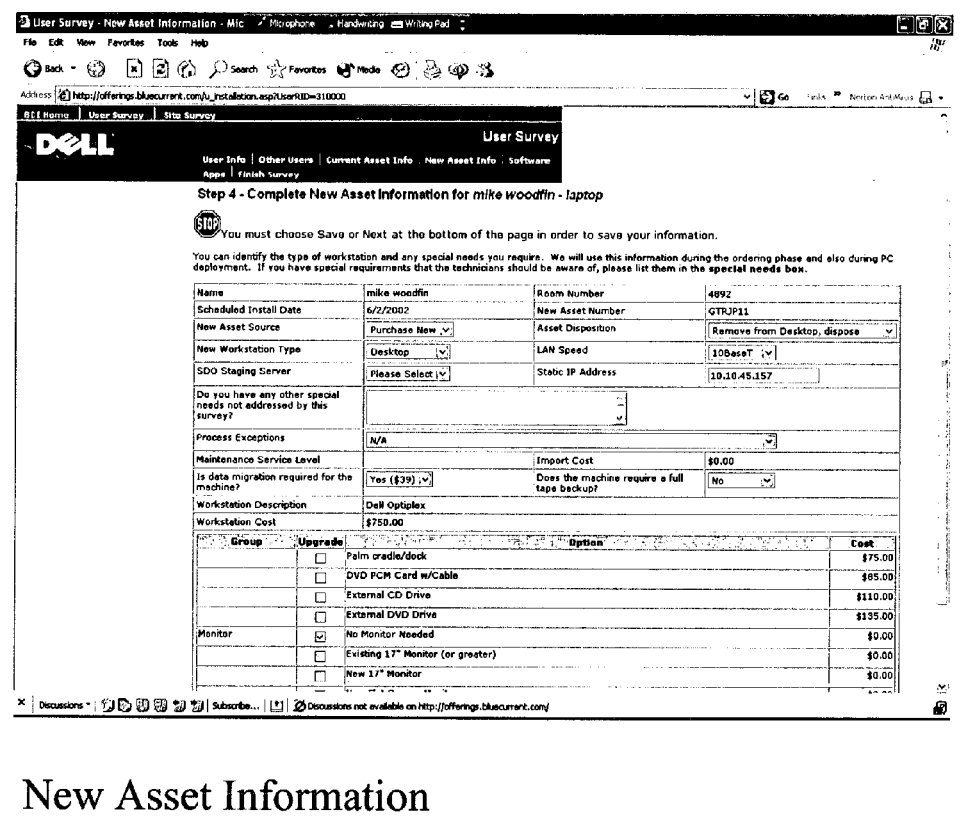

FIG. 5 illustrates screen display which a technician may use to impute new asset information. Such information is primarily used for the procurement of the new asset. Details for each new asset are generally derived from integrated configuration catalog. Such catalog contains basic information, as well as specific details, regarding specific configuration options for each asset. Such information is then forwarded to the selected manufacturer acquisition.

Figure 6:
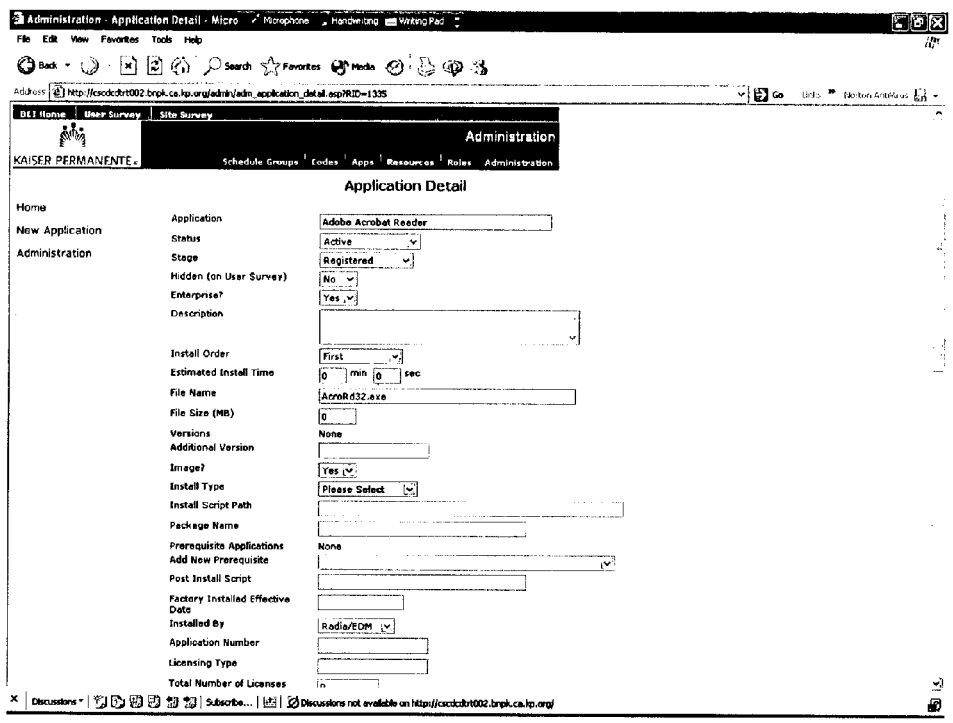
FIG. 6 is a screen display showing software application information aggregated during the method for integrated asset management.

FIG. 6 illustrates a screen display which a technician may use to impute software application information. Such information may include the name of the application, the status of the application, whether the application has been registered or not, whether the license for the application is an enterprise license, the order in which the application should be installed, and the version of the application.

Figure 7:
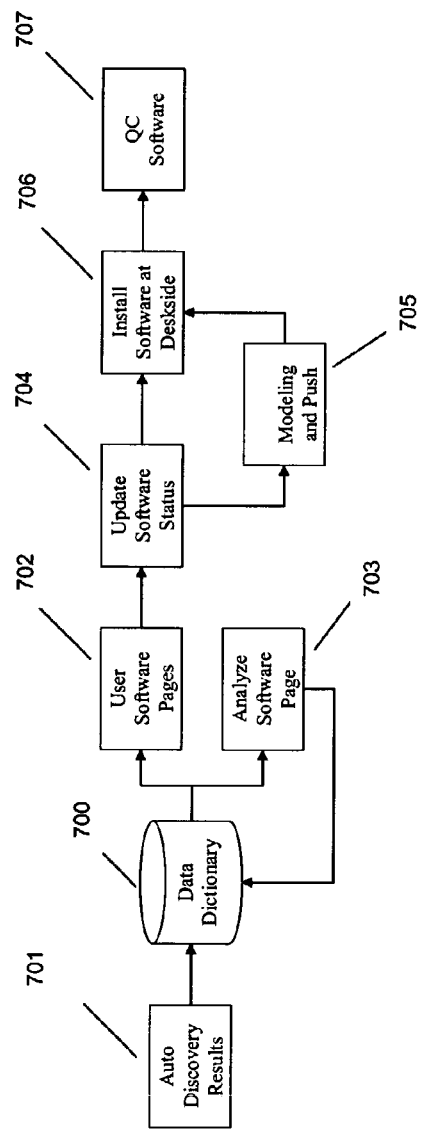
FIG. 7 is a workflow diagram showing the application management process.

FIG. 7 illustrates a work flow diagram showing the application management process. Initially, an electronic auto discovery tool identifies applications on the desktop. The equipment is scanned to identify the application used, information such as the names of executable files, manufacturer, version and path are captured, and the auto discovery results 701 are sent to the data dictionary 700 in the form of an XML package. The auto discovery results 701 are then processed against the data dictionary 700. The data dictionary 700 was created from electronic auto discovery processes with previous updates of non-discovered information. The data dictionary 700 therefor contains details about all available applications. Such as, for example, the status, the media on which it was installed, and authorized installers. The auto discovery results 701 are processed against the data dictionary 700 in order to control the discovery process, rationalize the results, control the installation process and control the quality of the installation.

A user software page 702 is then created based on the information in the data dictionary 700. During the creation of the user software page 702, the system will analyze the software page 703 against the information contained in the data dictionary 700. During this analysis, an assessment will be made of whether the applications discovered or selected are contained within the data dictionary and whether the applications are available in the image. The analysis will determine the difference between the applications on the user's software page 702 and those in the data dictionary 700. A report can then be generated of the differences. In addition, a mechanism can be incorporated to define an import missing applications into the dictionary. Once the user's software pages 702 have been established, the next step is to update the software status 704. Each software application can be classified as just for example "discovered" in which it doesn't appear in the technician's installation or quality control pages, "install" in which it appears on technicians and quality control pages, "do not install" in which it doesn't appear in technician or quality control pages or "install later" in which it doesn't appear in technician or quality control pages. In addition, non-packaged applications can be identified and installed or marked for later installation. Once the software status has been updated, 704, those software applications designated for installation will be installed 706. Thereafter, there will be a quality control function performed on the software 707. During this step, the applications are quality controlled against the intended list.

Figure 8:
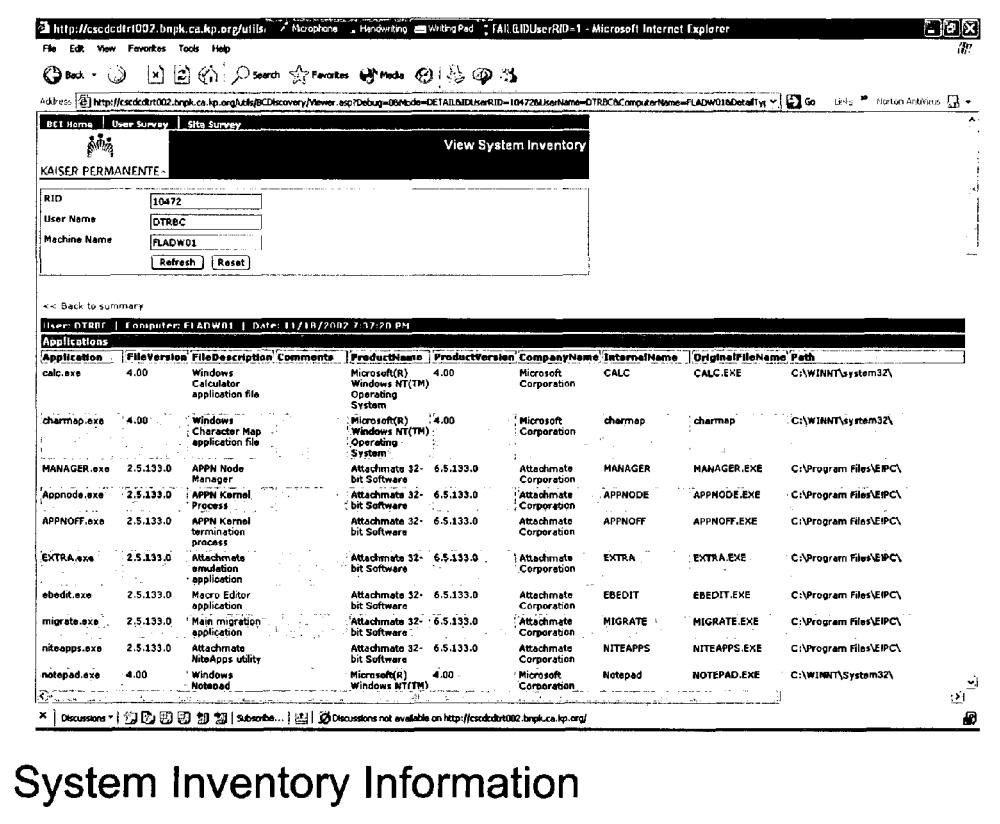

FIG. 8 illustrates a screen display showing system inventory information which may be generated from the Auto Discovery results. System inventory information contains such information as the names of executable files, the manufacturer of the product, the internal name of the product and the path. This information is subsequently forwarded to the data dictionary.

Figure 9:
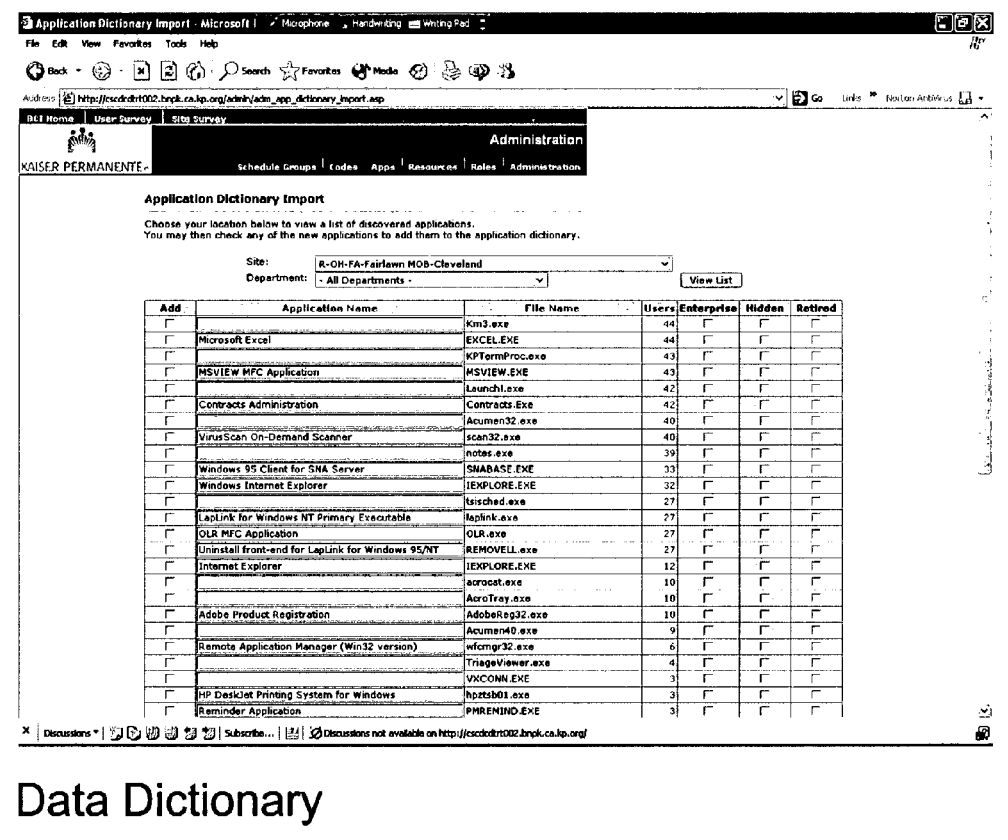

FIG. 9 illustrates the information contained in the data dictionary. The data dictionary contains information from the auto discovery results such as the software applications discovered and the applications available in the image.

Figure 10:
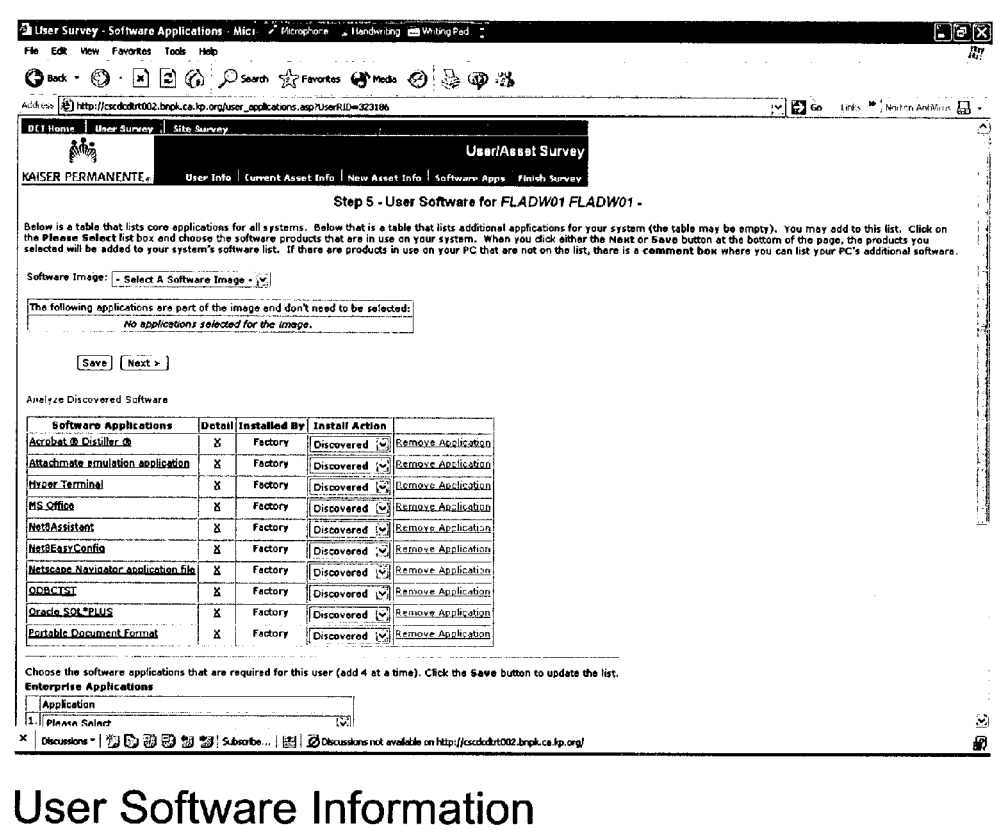

FIG. 10 illustrates a screen display showing user software information. User software information includes such information as the name of the software application, where the application was installed and the status of the application.

Figure 11:
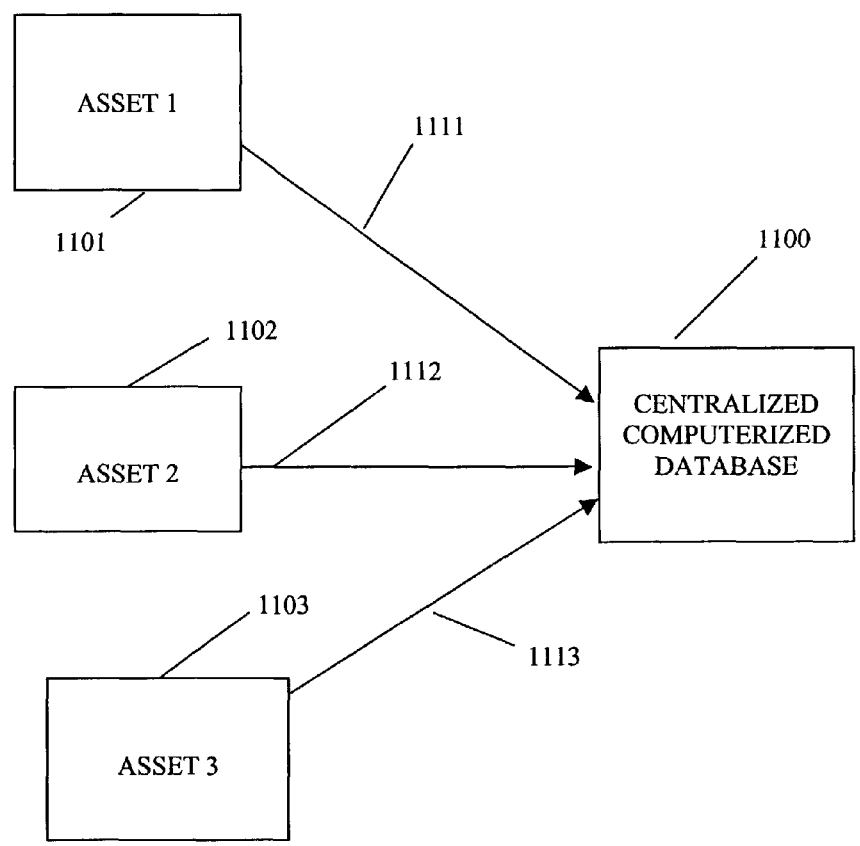
FIG. 11 is a system for integrated asset management.
Figure 1:
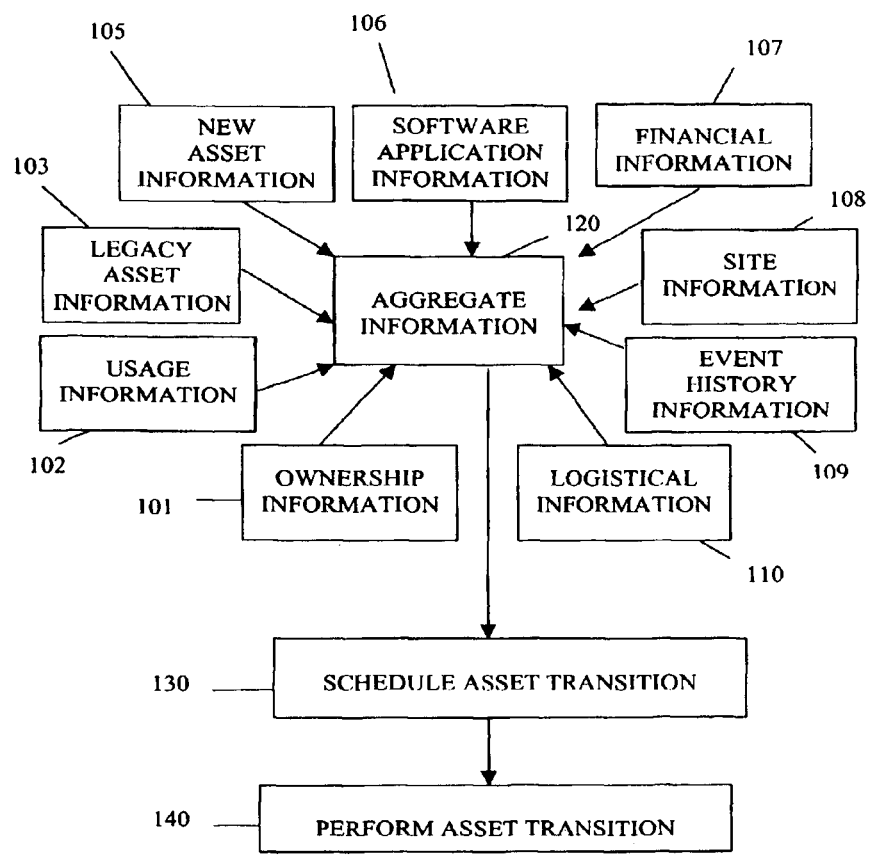

FIG. 11 illustrates the preferred embodiment for a system for integrated asset management. In this system, assets 1101, 1102 and 1103 connected to a centralized, computerized data base 1100. The system provides a means, 1111, 1112 and 1113 for aggregating information from the assets, 1101, 1102 and 1103 into the centralized, computerized data base 1100.

Once information has been received from the assets 1101, 1102 and 1103, asset transition events can be scheduled information relating to those asset transition events can be stored in the centralized, computerized data base 1100. Thereafter, the assets 1101, 1102 and 1103 can be tracked on an on-going basis so that information regarding future activities effecting the assets are recorded in the centralized, computerized data base 1100. Accordingly, future asset transition events can be scheduled using information contained in the centralized, computerized data base 1100.

It should be noted that the centralized, computerized data base 1100 may reside in a remote location separate from the assets. Information may be stored in the centralized, computerized data base 1100 in a relational data base. Information may be transmitted from the assets 1101, 1102 and 1103 through the centralized, computerized data base 1100 through, for example, the Internet or a local area network. Moreover, it may be desirable to make such transmissions in a secure, encrypted manner.

The assets in the system may, for example, be desktop computers, laptop computers, hand-held computers, printers, scanners, networking devices or storage devices. Information transmitted between the assets 1101, 1102 and 1103 through the centralized, computerized data base may include such information as user information, legacy asset information, new asset information, software application information, financial information, site information, event history information, logistical information, ownership information and usage information.

The previously described asset transition events may include such events as asset installation, asset relocation, asset disposition and asset maintenance. When information is conveyed from the assets 1101, 1102 and 1103 to the centralized, computerized data base 1100 the information may be first converted to a formatted data file for ease of storage and transmission and transfer. In addition, certain information may be filtered prior to transmission in order to remove unwanted or redundant information.

Information has been incorporated into the centralized, computerized data base and the assets 1101, 1102 and 1103, are being monitored, it may be desirable to manage activities of the assets. Management activities may include project management, installation management, relocation management, lease management, exception management, scheduling management, work flow management and resource management. In addition, it may be desirable to generate reports from the information contained in the centralized, computerized data base 1100. These reports may include project reports, asset reports, lease reports, activity reports, exception reports and consumer satisfaction reports. It may also be desirable to use the foregoing system to monitor, update and control versions of software resident on the assets 1101, 1102 and 1103. The system can also accommodate the translation of information in the centralized, computerized data base 1100 to a standard language.

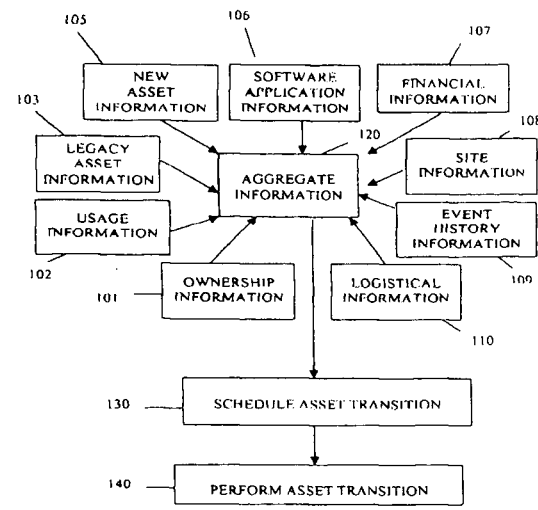

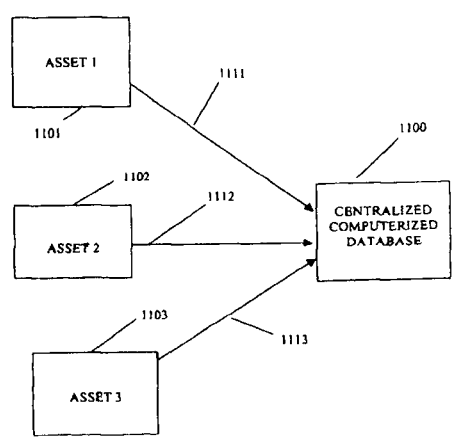

We claim:

1. A method comprising:
   receiving an indication of an occurrence of at least one transition event performed for at least one of a plurality of computer-related hardware devices, wherein the plurality of computer-related hardware devices include respective processors;
   recording information from the transition event into a centralized computerized database;
   monitoring for at least one change to the plurality of computer-related hardware devices and recording information associated with the change into the centralized computerized database; and
   managing at least one additional transition event for at least one of the plurality of computer related hardware devices using information available in the centralized computerized database.

2. The method of claim 1, wherein managing at least one additional transition event includes managing the additional transition event based upon information available in the centralized computerized database that includes at least one of: user information identifying a user of each computer-related hardware device, legacy asset information concerning currently possessed computer-related hardware devices, new information concerning newly acquired computer-related hardware devices, software application information identifying software installed on the computer-related hardware devices, site information identifying a location of the computer-related hardware devices, or event history information identifying previous computer-related hardware device transition events.

3. The method of claim 1, wherein recording information from the transition event into a centralized computerized database includes recording information from the transition event into a relational database.

4. The method of claim 1, wherein receiving an indication of an occurrence of at least one transition event comprises receiving an indication of at least one of: an installation of at least one of the computer-related hardware devices, a relocation of at least one of the computer-related hardware devices, a disposition of at least one of the computer-related hardware devices, or maintenance performed on at least one of the computer-related hardware devices.

5. The method of claim 1, wherein receiving an indication of an occurrence of at least one transition event includes receiving an indication of an occurrence of a transition event involving at least one of: a desktop computer, a laptop computer, a handheld computer, a printer, a scanner, a networking device, or a storage device.

6. The method of claim 1, wherein recording information from the transition event includes recording information from the transition event into a centralized computerized database that is located remotely from the location of the transition event.

7. The method of claim 1, further comprising transmitting the information from the transition event and the information associated with the changes to the centralized computerized database through the Internet.

8. The method of claim 1, further comprising transmitting the information from the transition event and the information associated with the changes to the centralized computerized database through a local area network.

9. The method of claim 1, further comprising transmitting the information from the transition event and the information associated with the changes to the centralized computerized database through secure, encrypted transmission.

10. The method of claim 1, further comprising converting the information from the transition event and the information associated with the changes to formatted data files prior to the transmission to the centralized computerized database.

11. The method of claim 1, further comprising filtering the information from the transition event and the information associated with the changes prior to transmission to the centralized computerized database to remove unwanted or redundant information.

12. The method of claim 1, wherein the monitoring is conducted on a continuous basis using a communications link, and wherein recording information includes recording the information associated with the computer-related hardware devices and the information associated with the changes to the centralized computerized database on a real-time basis.

13. The method of claim 1, wherein managing at least one additional transition event includes at least one of: project management, installation, relocation management, lease management, exception management, scheduling management, workflow management, or resource management.

14. The method of claim 1, further comprising generating reports derived from information located in the centralized computerized database.

15. The method of claim 14, wherein generating reports includes generating at least one of: a project report, an asset report, a lease report, an activity report, an exception report, or a consumer satisfaction report.

16. The method of claim 1, further comprising monitoring, updating, or controlling versions of software resident on the computer-related hardware devices.

17. The method of claim 1, further comprising translating the information in the centralized computerized database into a common language.

18. A system comprising:
means for receiving an indication of at least one transition event performed for at least one of a plurality of computer-related hardware devices using information stored in a centralized computerized database, wherein the plurality of computer related hardware devices include respective processors;
means for recording information from the transition event into the centralized computerized database;
means for monitoring changes to the plurality of computer-related hardware devices and recording information associated with the changes into the centralized computerized database; and
means for managing at least one additional transition event for at least one of the plurality of computer related hardware devices using information available in the centralized computerized database.

19. The system of claim 18, further comprising the centralized computerized database, and wherein the centralized computerized database is located remotely from the location of the transition event.

20. The system of claim 19, wherein the centralized computerized database is a relational database.

21. The system of claim 18, further comprising means for transmitting the information from the transition event and the information associated with the changes to the centralized computerized database through the Internet.

22. The system of claim 18, further comprising means for transmitting the information from the transition event and the information associated with the changes to the centralized computerized database through a local area network.

23. The system of claim 22, further comprising means for transmitting the information from the transition event and the information associated with the changes to the centralized computerized database through secure, encrypted transmission.

24. The system of claim 18, wherein the means for receiving an indication include means for receiving an indication of at least one transition event involving at least one of: a desktop computer, a laptop computer, a handheld computer, a printer, a scanner, a networking device, or a storage device.

25. The system of claim 18, wherein the means for managing at least one additional transition event are configured to use information available in the centralized computerized database that includes at least one of: user information identifying a user of each computer-related hardware device, legacy asset information concerning currently possessed computer-related hardware devices, new information concerning newly acquired computer-related hardware devices, software application information identifying software installed on the computer-related hardware devices, site information identifying a location of the computer-related hardware devices, or event history information identifying previous computer-related hardware device transition events.

26. The system of claim 18, wherein the means for receiving an indication of at least one transition event are configured to receive an indication of a computer-related hardware device transition event that includes at least one of: an installation of at least one of the computer-related hardware devices, a relocation of at least one of the computer-related hardware devices, a disposition of at least one of the computer-related hardware devices, or a maintenance performed on at least one of the computer-related hardware devices.

27. The system of claim 18, further comprising means for converting the information from the transition event and the information associated with the changes to formatted data files prior to the transmission to the centralized computerized database.

28. The system of claim 18, further comprising means for filtering the information from the transition event and the information associated with the changes prior to transmission to the centralized computerized database to remove unwanted or redundant information.

29. The system of claim 18, wherein the means for monitoring changes to the plurality of computer-related hardware devices comprises means for continuously monitoring changes to the computer-related hardware devices using a communications link.

30. The system of claim 18, wherein the means for managing at least one additional transition event are configured to manage at least one additional transition event that involves at least one of: project management, installation, relocation management, lease management, exception management, scheduling management, workflow management, or resource management.

31. The system of claim 18, further comprising means for generating reports derived from information located in the centralized computerized database.

32. The system of claim 31, wherein the means for generating reports are configured to generate at least one of: a project report, an asset report, a lease report, an activity report, an exception report, or a consumer satisfaction report.

33. The system of claim 18, further comprising means for monitoring, updating, or controlling versions of software resident on the computer-related hardware devices.

34. The system of claim 18, further comprising means for causing translation of at least one instance of information, stored in a first language in the centralized computerized database, into a second language.

35. The method of claim 7, further comprising transmitting the information from the transition event and the information associated with the changes to the centralized computerized database through secure, encrypted transmission.

36. The system of claim 18, wherein the means for monitoring changes are configured to monitor changes to a plurality of computer-related hardware devices that are configured to communicate electronically to the centralized computerized database.

37. The system of claim 21, further comprising means for transmitting the information from the transition event and the information associated with the changes to the centralized computerized database through secure, encrypted transmission.

* * * * *

UNITED STATES PATENT AND TRADEMARK OFFICE
CERTIFICATE OF CORRECTION

PATENT NO. : 8,266,124 B2
APPLICATION NO. : 10/321107
DATED : September 11, 2012
INVENTOR(S) : Thomas et al.

It is certified that error appears in the above-identified patent and that said Letters Patent is hereby corrected as shown below:

The title page showing the illustrative figure should be deleted to be replaced with the attached title page.

On the Title Page, item (56), under "OTHER PUBLICATIONS", in Column 2, Line 2, delete "1 pages." and insert -- 1 page. --, therefor.

On Title Page 3, item (56), under "FOREIGN PATENT DOCUMENTS", in Column 1, Line 1, delete "EP 0 836 140 4/1998".

On Title Page 3, item (56), under "FOREIGN PATENT DOCUMENTS", in Column 1, Line 5, delete "EP 1 251 656 10/2002".

On Title Page 3, item (56), under "FOREIGN PATENT DOCUMENTS", in Column 1, Line 7, delete "EP 1 255 196 11/2002".

On Title Page 3, item (56), under "FOREIGN PATENT DOCUMENTS", in Column 1, Line 9, delete "GB 2340273 2/2000".

On Title Page 3, item (56), under "FOREIGN PATENT DOCUMENTS", in Column 1, Line 12, delete "WO PCT/AU97/00594 1/1997".

On Title Page 3, item (56), under "FOREIGN PATENT DOCUMENTS", in Column 1, Line 17, delete "WO PCT/US00/29146 5/2000".

On Title Page 3, item (56), under "FOREIGN PATENT DOCUMENTS", in Column 1, Line 18, delete "WO PCT/US00/11140 11/2000".

On Title Page 3, item (56), under "FOREIGN PATENT DOCUMENTS", in Column 1, Line 19, delete "WO PCT/US00/12806 11/2000".

Signed and Sealed this
Twenty-second Day of July, 2014

Michelle K. Lee
*Deputy Director of the United States Patent and Trademark Office*

CERTIFICATE OF CORRECTION (continued)
U.S. Pat. No. 8,266,124 B2

On Title Page 3, item (56), under "FOREIGN PATENT DOCUMENTS", in Column 1, Line 25, delete "WO PCT/US01/13809 11/2001".

On Title Page 3, item (56), under "FOREIGN PATENT DOCUMENTS", in Column 1, Line 28, delete "WO PCT/US01/16629 3/2002".

On Title Page 3, item (56), under "FOREIGN PATENT DOCUMENTS", in Column 1, Line 43, delete "WO PCT/IB03/002555 12/2003".

On Title Page 3, item (56), under "OTHER PUBLICATIONS", in Column 2, Line 39, delete "System"" and insert -- System", --, therefor.

On Title Page 3, item (56), under "OTHER PUBLICATIONS", in Column 2, Line 51, delete "Serial." and insert -- Serial --, therefor.

On Title Page 3, item (56), under "OTHER PUBLICATIONS", in Column 2, Line 58, delete "R." and insert -- R., --, therefor.

On Title Page 3, item (56), under "OTHER PUBLICATIONS", in Column 2, Line 58, delete "Layer,"" and insert -- Layer", --, therefor.

On Title Page 3, item (56), under "OTHER PUBLICATIONS", in Column 2, Line 62, delete "Management,"" and insert -- Management", --, therefor.

On Title Page 3, item (56), under "OTHER PUBLICATIONS", in Column 2, Line 66, delete "Guide,"" and insert -- Guide", --, therefor.

On Title Page 3, item (56), under "OTHER PUBLICATIONS", in Column 2, Line 67, delete "Administration,"" and insert -- Administration", --, therefor.

On Title Page 3, item (56), under "OTHER PUBLICATIONS", in Column 2, Line 70, delete "Banks,"" and insert -- Banks", --, therefor.

On Title Page 3, item (56), under "OTHER PUBLICATIONS", in Column 2, Line 70, delete "1970,republished" and insert -- 1970, republished --, therefor.

On Title Page 3, item (56), under "OTHER PUBLICATIONS", in Column 2, Line 71, delete "Systems, "" and insert -- Systems", --, therefor.

On Title Page 4, item (56), under "OTHER PUBLICATIONS", in Column 1, Line 2, delete "Guide, "" and insert -- Guide", --, therefor.

On Title Page 4, item (56), under "OTHER PUBLICATIONS", in Column 1, Line 3, delete "p.1." and insert -- p.1, --, therefor.

CERTIFICATE OF CORRECTION (continued)
U.S. Pat. No. 8,266,124 B2

In the Drawings

In the drawing sheet, consisting of Fig. 1, should be deleted to be replaced with the drawing sheet, consisting of Fig. 1, as shown on the attached page.

In the Specification

In Column 2, Line 15, delete "and".

In Column 2, Line 17, delete "process." and insert -- process; and --, therefor.

(12) United States Patent
Thomas et al.

(10) Patent No.: US 8,266,124 B2
(45) Date of Patent: Sep. 11, 2012

(54) INTEGRATED ASSET MANAGEMENT

(75) Inventors: Shawn Thomas, Austin, TX (US);
Gregory Gray, Austin, TX (US);
Michael Woodfin, Austin, TX (US);
Warner Mizell, Austin, TX (US); Brian Thomas, Austin, TX (US)

(73) Assignee: Caldvor Acquisitions Ltd., LLC, Dover, DE (US)

( * ) Notice: Subject to any disclaimer, the term of this patent is extended or adjusted under 35 U.S.C. 154(b) by 2473 days.

(21) Appl. No.: 10/321,107

(22) Filed: Dec. 17, 2002

(65) Prior Publication Data
US 2003/0154199 A1 Aug. 14, 2003

Related U.S. Application Data

(60) Provisional application No. 60/342,031, filed on Dec. 18, 2001.

(51) Int. Cl.
*G06F 17/00* (2006.01)
(52) U.S. Cl. ........ 707/703; 707/791; 707/793; 707/796; 707/811; 707/802
(58) Field of Classification Search .......... 707/200, 707/201, 104.1, 703, 791, 793, 796, 802, 707/811, 822; 705/8, 39; 703/22; 709/217
See application file for complete search history.

(56) References Cited

U.S. PATENT DOCUMENTS

| | | | |
|---|---|---|---|
| 4,558,413 A | 12/1985 | Schmidt et al. | |
| 4,643,112 A | 2/1987 | Sidler et al. | |
| 4,653,112 A | 3/1987 | Ouimette | |
| 4,695,946 A | 9/1987 | Andreasen et al. | |
| 4,714,995 A | 12/1987 | Materna et al. | |
| 5,005,122 A | 4/1991 | Griffin et al. | |
| 5,019,963 A | 5/1991 | Alderson et al. | |
| 5,133,075 A | 7/1992 | Risch | |
| 5,155,847 A | 10/1992 | Kirouac et al. | |
| 5,249,290 A | 9/1993 | Heizer | |
| 5,278,982 A | 1/1994 | Daniels | |
| 5,339,176 A | 8/1994 | Smilansky et al. | |
| 5,355,498 A | 10/1994 | Provino | |
| 5,414,843 A * | 5/1995 | Nakamura et al. | 707/104.1 |

(Continued)

FOREIGN PATENT DOCUMENTS

CN 1204410 1/1999

(Continued)

OTHER PUBLICATIONS

"PCT International Preliminary Examination Report", Application No. PCT/US02/40820, 1 pages.

(Continued)

*Primary Examiner* — Sana Al Hashemi
(74) *Attorney, Agent, or Firm* — Perkins Coie LLP

(57) ABSTRACT

The method and system of the present invention provides an improved technique for integrated asset management. Information is aggregated from a variety of sources into a centralized computerized database. Thereafter, asset transition events are scheduled. Information from the centralized computerized database is used in the performance of the asset transition events and information relating to the asset transition events is added to the centralized computerized database. Subsequent changes to the asset are also recorded into the centralized computerized database. As a result, a plethora of information is available within said database for the purpose of managing future asset transition events.

37 Claims, 11 Drawing Sheets